(12) United States Patent
Leisering

(10) Patent No.: US 11,458,558 B2
(45) Date of Patent: Oct. 4, 2022

(54) SOLDERING NOZZLE AND SOLDERING INSTALLATION

(71) Applicant: ERSA GmbH, Wertheim (DE)

(72) Inventor: Alexander Leisering, Wertheim (DE)

(73) Assignee: ERSA GmbH, Wertheim (DE)

(*) Notice: Subject to any disclaimer, the term of this patent is extended or adjusted under 35 U.S.C. 154(b) by 0 days.

(21) Appl. No.: 16/977,240

(22) PCT Filed: Mar. 1, 2019

(86) PCT No.: PCT/EP2019/055115
§ 371 (c)(1),
(2) Date: Sep. 1, 2020

(87) PCT Pub. No.: WO2019/170535
PCT Pub. Date: Sep. 12, 2019

(65) Prior Publication Data
US 2021/0039183 A1 Feb. 11, 2021

(30) Foreign Application Priority Data
Mar. 8, 2018 (DE) ...................... 10 2018 105 388.6

(51) Int. Cl.
*B23K 3/00* (2006.01)
*B23K 3/06* (2006.01)
*B23K 1/08* (2006.01)

(52) U.S. Cl.
CPC ............ *B23K 3/0653* (2013.01); *B23K 1/085* (2013.01)

(58) Field of Classification Search
CPC ......... B23K 3/0653; B23K 1/085; H05K 3/34
USPC .................................................... 228/37, 260
See application file for complete search history.

(56) References Cited

U.S. PATENT DOCUMENTS

| 4,101,066 A * | 7/1978 | Corsaro ............... B23K 3/0653 228/180.1 |
| 8,770,463 B1 | 7/2014 | Puttichaem et al. |
| 2002/0110636 A1 | 8/2002 | Tombs et al. |
| 2016/0228968 A1* | 8/2016 | Schutz ................... B23K 1/085 |

(Continued)

FOREIGN PATENT DOCUMENTS

| CN | 104084661 A | 10/2014 |
| CN | 106112181 A | 11/2016 |
| CN | 106211625 A | 12/2016 |

(Continued)

OTHER PUBLICATIONS

Machine translation of DE20200554U1 (no date available).*

(Continued)

*Primary Examiner* — Kiley S Stoner
(74) *Attorney, Agent, or Firm* — George McGuire

(57) ABSTRACT

The invention relates to a soldering nozzle for the simultaneous selective wave soldering of at least two spaced-apart rows of solder joints in a soldering installation, with a base portion which can be arranged on a nozzle plate, and with a wave portion which forms the solder wave during operation and which has a peripheral wall having a free upper side, and with at least one separating strip which can be inserted into the wave portion and which can be wetted with solder, wherein the at least one separating strip is formed as a frameless separating strip. The invention also relates to a soldering installation having a nozzle plate and having at least one soldering nozzle.

12 Claims, 5 Drawing Sheets

(56) References Cited

U.S. PATENT DOCUMENTS

2019/0039159 A1* 2/2019 Suzuki ................ B23K 3/0653
2019/0381590 A1* 12/2019 Dautenhahn ........... B23K 1/085

FOREIGN PATENT DOCUMENTS

| DE | 3300153 A1 * | 7/1983 | ........... B23K 3/0653 |
| DE | 20200554 U1 | 5/2002 | |
| DE | 10 2013 110 731 B3 | 11/2014 | |
| DE | 102013110731 B3 | 11/2014 | |
| DE | 102014119682 A1 | 6/2016 | |
| JP | 58013471 A * | 1/1983 | ........... B23K 3/0653 |
| JP | 09008450 A * | 1/1997 | |
| TW | 200414955 A | 8/2004 | |

OTHER PUBLICATIONS

International Search Report and Non-Translated Written Opinion Form PCT/IS/210 and PCT/ISA/237, International Application No. PCT/EP2019/055115, pp. 1-9, International Filing Date Jan. 3, 2019, dated Jul. 18, 2019.
Examination Report of DE 10 2018 105 388.6, dated Dec. 7, 2018.
Chinese Office Communication, dated Sep. 7, 2021, pp. 1-8.

* cited by examiner

SOLDERING NOZZLE AND SOLDERING INSTALLATION

CROSS-REFERENCE TO RELATED APPLICATION

The present application is the United States National Phase application of PCT Application PCT/EP2019/055115 filed Mar. 1, 2019, which relates and claims priority to German Application No. DE 10 2018 105 388.6 filed Mar. 8, 2018, the entirety of each of which is incorporated herein by reference.

The invention relates to a soldering nozzle for the simultaneous selective wave soldering of at least two spaced apart rows of solder joints in a soldering installation, comprising a main body which has a base portion that can be arranged on a nozzle plate and which has a wave portion that forms the solder wave during operation and has a peripheral wall having a free upper side, and comprising at least one separating strip which can be inserted into the wave portion and wetted with solder. The invention also relates to a soldering installation comprising at least one soldering nozzle of this kind.

Soldering nozzles of the type mentioned at the outset are known from DE 10 2013 110 731 B3, for example. A soldering nozzle having the features of the preamble of claim 1 is known from DE 202 00 554 U1, for example. Another soldering nozzle is known from DE 10 2013 110 731 B3.

When manufacturing assembled printed circuit boards, the components arranged on the printed circuit board are connected to the printed circuit board by means of selective wave soldering. In installations for selective wave soldering, a plurality of soldering nozzles are often arranged for example on a nozzle plate such that the outlet openings of the soldering nozzles point substantially vertically upward when in the soldering position. The cross section of each soldering nozzle is in this case shaped specifically for the soldering region, and each soldering nozzle is associated with a specific region of the printed circuit board that is to be soldered. In order to solder, the soldering nozzle or the nozzle plate comprising the soldering nozzles arranged thereon is pulled up to the printed circuit board to be soldered from below. At the same time, liquid solder flows through the interior of the soldering nozzle from below, emerges in a wave-like manner at the nozzle opening which is at the top when in the soldering position, and wets the solder joints of the printed circuit board positioned there such that the desired solder connection is produced between the component to be soldered—or between the wire projection of the component—and the associated region of the printed circuit board conductor path.

Precise control of all of the process parameters, such as temperatures, solder flow rates, distances, feed rates, etc., is of great importance during selective wave soldering, or during multi-wave soldering using a plurality of soldering nozzles, in order to obtain high-quality solder joints with high reproducibility. Furthermore, a key requirement in wave soldering is that undesired solder bridges must not be produced between adjacent solder joints, for example as a result of displaced or excess solder, or as a result of undesired residual soldering blobs.

In order to ensure that the solder flow is broken in a defined manner at the right time as required after a solder joint or a row of solder joints has been wetted or soldered, it is known to arrange metal strips made of material that can be wetted with solder in the region of the solder wave or solder nozzle, for example. During the soldering process, these metal strips are moved in the immediate vicinity of the solder joint or a row of solder joints. During soldering, a connection made of liquid solder is formed between the solder joint and the metal strip. In this way, excess solder is intended to be guided away from the printed circuit board or from the solder joints in order to thus prevent the formation of undesired solder bridges between adjacent solder joints or adjacent rows of solder joints.

In DE 10 2013 110 731 B3, a plurality of separating strips are surrounded by a frame in each case as strip packets, and the entire frame together with the separating strips is then inserted into a soldering nozzle. Different strip packets are therefore required for solder nozzles which have different designs and different geometries.

Soldering nozzles comprising separating strips arranged in soldering nozzles are known from CN 104084661 A1 and DE 102014 119 682 A1.

The problem addressed by the present invention is that of providing soldering nozzles which meet the requirements described above and yet have a simple and functionally reliable structure, are easy to operate in a functionally reliable manner and are interchangeable.

This problem is solved by a soldering nozzle having the features of claim 1. The at least one separating strip is therefore in particular designed as a frameless separating strip. Moreover, holding means for holding the separating strip are provided in the main body. The holding means therefore prevents the separating strip from being flushed out of the wave portion unintentionally, for example as a result of the formation of the solder wave. The holding means are in this case designed as magnetic means. The separating strip is in this case made at least in portions from ferromagnetic material, the holding means being designed as holding magnets provided on the main body. In this case it is conceivable for magnet recesses to be provided on the side of the bottom of the wave portion that faces away from the separating strip, in which magnet recesses holding magnets which interact with the separating strip are arranged. As a result of the holding magnets being arranged under the bottom of the wave portion, said magnets do not come into contact with the liquid solder. The holding magnets are therefore safely protected and are not subjected to contamination and wear.

As a result, the separating strip can be detachably inserted into the wave portion as an individual separating strip. It is therefore formed independently of other separating strips and then, unlike in DE 10 2013 110 731 B1, does not form a strip packet having a frame. Overall, a high degree of flexibility can be achieved in this way. The separating strips can thus also be manufactured individually at low cost. According to the invention, separating strips can be inserted into the relevant wave portion even when the geometries of the soldering nozzle or the inner geometry of the wave portion are different.

The relevant separating strip has free narrow sides and an underside, the narrow sides and/or the underside coming to rest against contact portions when the separating strip is inserted into the wave portion. As a result, the separating strip can be positioned in the wave portion in such a way that the liquid solder can be suitably guided along the wave portion.

Moreover, the contact portions are designed as receiving grooves which receive the narrow sides and/or the underside of the separating strip. This means that the separating strip can be arranged securely in the wave portion.

The receiving grooves are formed by insert parts inserted into the main body. The insert parts can in this case preferably be made of metal. This is advantageous in that the receiving grooves can be designed to be comparatively precise and wear-resistant.

A further advantageous arrangement is produced when the insert parts are height-adjustable in order to adjust the height of the separating strip in relation to the main body. The separating strip can be optimally adapted to the soldering process by means of adjusting the height in particular perpendicularly to the nozzle plate.

In this case it is advantageous for the insert parts to have a bolt portion which is arranged in a bolt guide of the main body so as to be axially movable, and for fixing means to be provided for fixing the bolt portion in the bolt guide.

Possible fixing means include, for example, clamping screws arranged transversely to the bolt portion, the free end of which screw acts against the bolt portion in order to fix the bolt portion.

In order to ensure that the magnets are securely arranged in the main body even at different temperatures, it is advantageous for pre-tensioned springs to be provided, by means of which the holding magnets are pre-loaded against the bottom of the wave portion in the direction of the separating strip. The pre-tensioned springs can in this case be designed as helical springs, one end of which is supported on the relevant holding magnet and the other end of which is supported on a threaded bolt which can be screwed into the main body. The holding magnets as such can therefore be arranged in a blind bore, with the bottom of the blind bore then also forming the bottom of the wave portion. The bore is sealed on the side facing away from the bottom by the threaded bolt, the relevant pre-tensioned spring being arranged between the threaded bolt and the magnet.

The problem set out above is also solved by a soldering installation comprising a nozzle plate and comprising at least one soldering nozzle according to the invention provided on the nozzle plate.

Further details and advantageous designs of the invention can be found in the following description, with reference to which different embodiments of the invention will be described and explained in greater detail.

Figure 1:
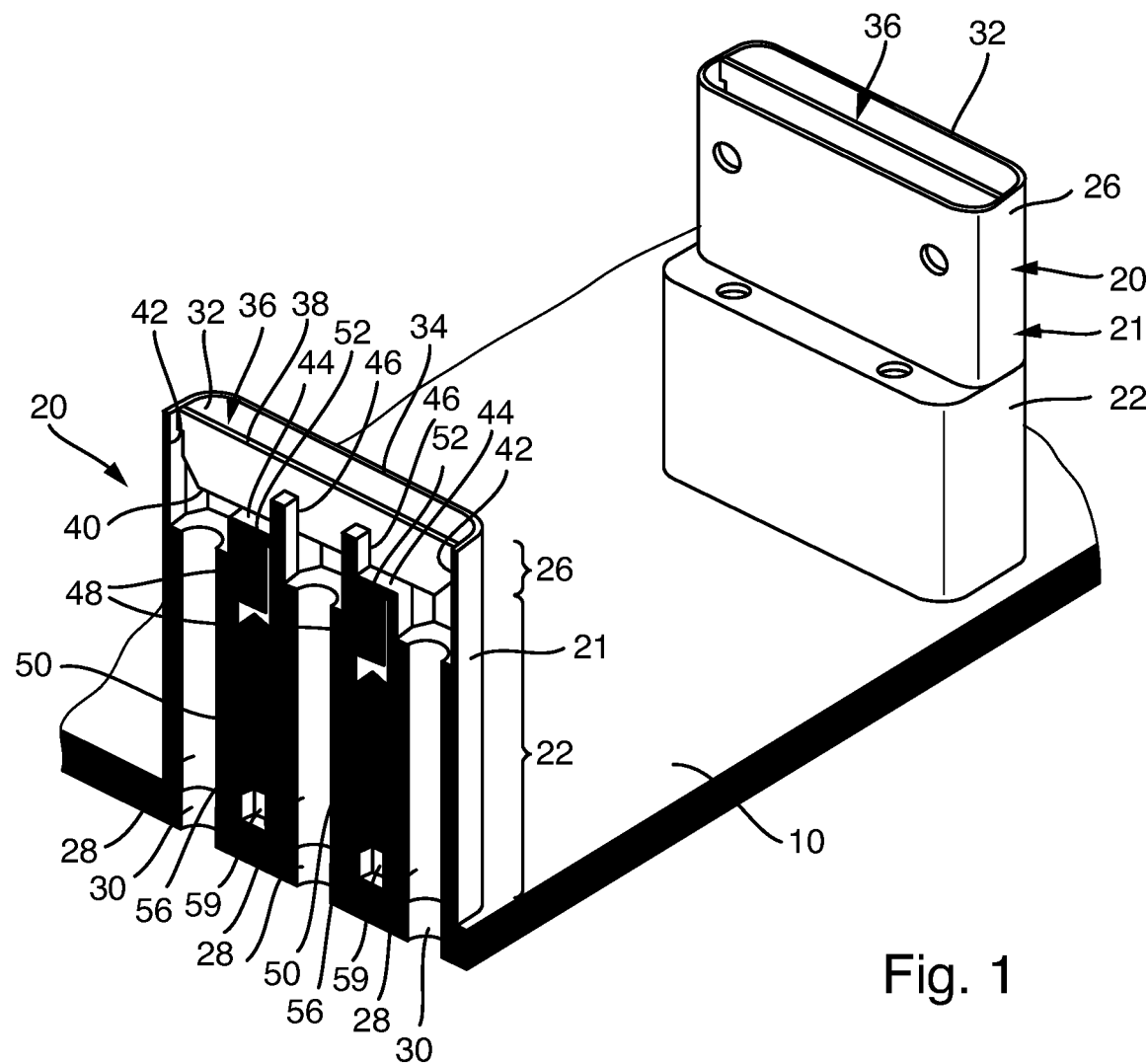
FIG. 1 is an oblique view onto a nozzle plate comprising two soldering nozzles of a first embodiment according to the invention.

FIG. 1 shows a nozzle plate 10 of a soldering installation. Two soldering nozzles 20 are arranged on the nozzle plate 10. Each soldering nozzle 20 has a main body 21 comprising a base portion 22 by means of which the relevant soldering nozzle 20 is fastened to the nozzle plate 10, for example using screws. The main bodies 21 20 also have a wave portion 26, in which a wave of liquid solder forms during operation of the nozzle plate 10. The relevant base portion 22 has solder guides 28 which extend perpendicularly to the nozzle plate 10 and correspond to feed bores 30 in the nozzle plate 10. During operation, liquid solder can therefore flow into the wave portion 26 via the solder guides 28. The wave portion 26 in this case has a peripheral wall 32 having a free upper edge 34.

Figure 2:
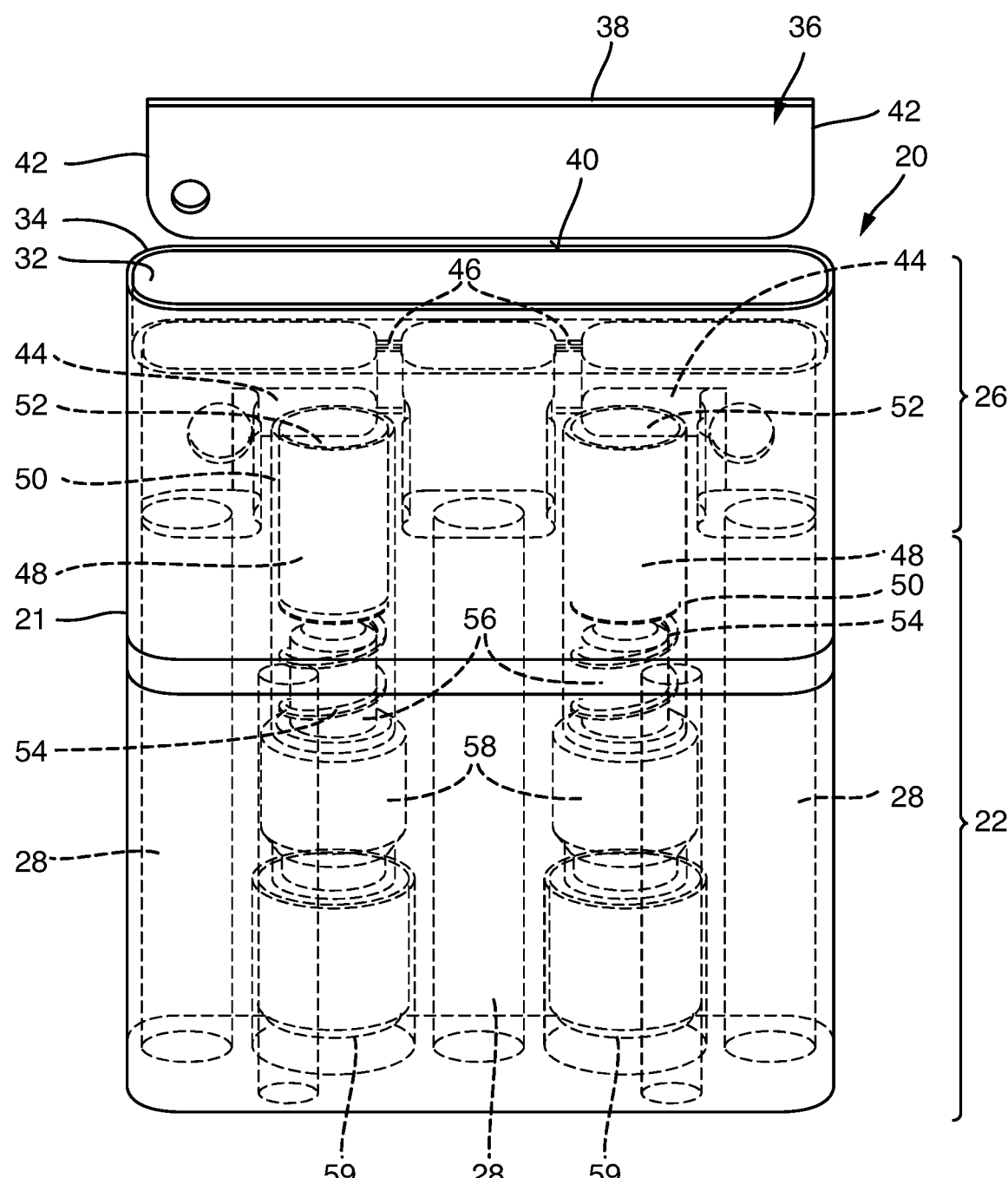
FIG. 2 shows a soldering nozzle from FIG. 1 as an individual part.

As can be clearly seen in FIGS. 1 and 2, a frameless separating strip 36 is inserted into the wave portion 26. The separating strip 36 is in this case flat and has an upper side 38, an underside 40 and two narrow sides 42. The narrow sides 42 in this case rest against the inside of the wall 32. The wall 32 can in this case provide groove-like receiving portions for receiving the narrow sides 42 in the region of the narrow sides 42 of the separating strip 36.

The underside 40 of the separating strip 36 rests against contact portions 44 of the main body 21 when the separating strip 36 is inserted into the wave portion 26. Moreover, the underside of the separating strip 36 is provided with receiving grooves 46. The separating strip 36 is therefore inserted into the receiving grooves 46 when it is inserted into the wave portion 26, as a result of which the separating strip 36 is ultimately arranged in the wave portion 26 in a precisely positioned manner.

The separating strip 36 is in this case made of a material which can be wetted with solder, for example steel. As a result, excess solder can be guided away from the printed circuit board or from the solder joints during soldering, in order to thus prevent the formation of undesired solder bridges between adjacent solder joints or adjacent rows of solder joints.

The separating strip 36 shown in FIGS. 1 and 2 can be easily manufactured from a flat material and inserted into the associated soldering nozzle 20 or wave portion 26 thereof.

As is particularly clear from FIG. 2, holding means in the form of two holding magnets 48 are provided in the main body 21, which means hold the separating strip 36 made of a ferromagnetic material in the wave portion 26. This prevents the separating strip 36 from being flushed out of the wave portion 26 during operation.

The holding magnets 48 are provided in the base portion 22, and magnet recesses which can be accessed from the side of the nozzle plate 10 are provided in the form of blind holes 50. A bottom portion 52 is therefore provided between the holding magnet 48 and the contact portions 44. The relevant magnetic field of the holding magnets 48 acts through the relevant bottom portion 52 in order to load the separating strip 36 against the relevant contact portion 44.

In order to ensure that the relevant holding magnet 48 comes to rest securely against the bottom portion 52, even at the operating temperature of liquid solder, a pre-tensioned spring 54 is provided in the relevant blind hole 50. The pre-tensioned springs 54 are arranged such that one end thereof is supported on the relevant holding magnet 48 and the other end thereof is supported on a threaded bolt 56 screwed into the relevant blind hole 50. For this purpose, the threaded bolts 56 provide a thread 58 which interacts with a counter thread provided on the relevant blind hole 50. In order to screw in the threaded bolts 56, said threaded bolts have a key receptacle 59, for example in the form of a hexagon socket, on the underside facing away from the relevant holding magnet 48.

Figure 3:
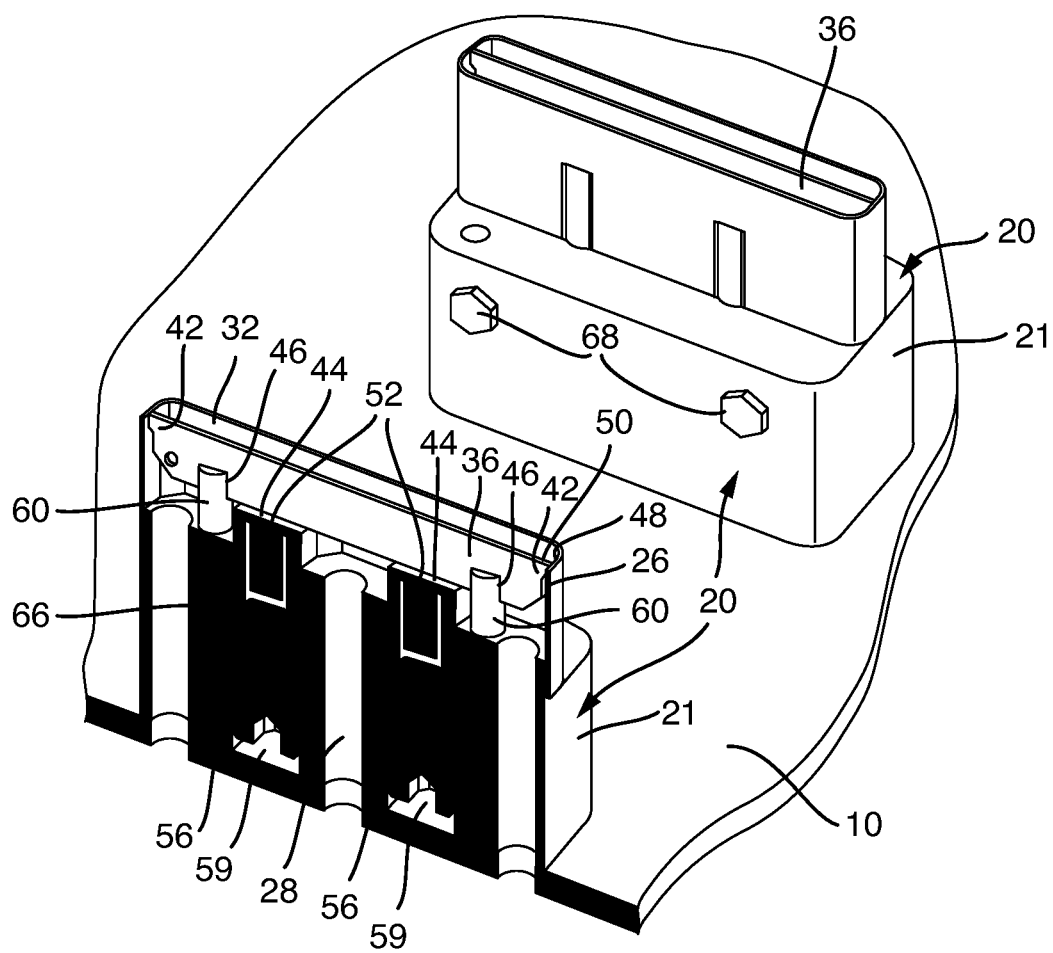
FIG. 3 is an oblique view onto two soldering nozzles of a second embodiment according to the invention.
Figure 4:
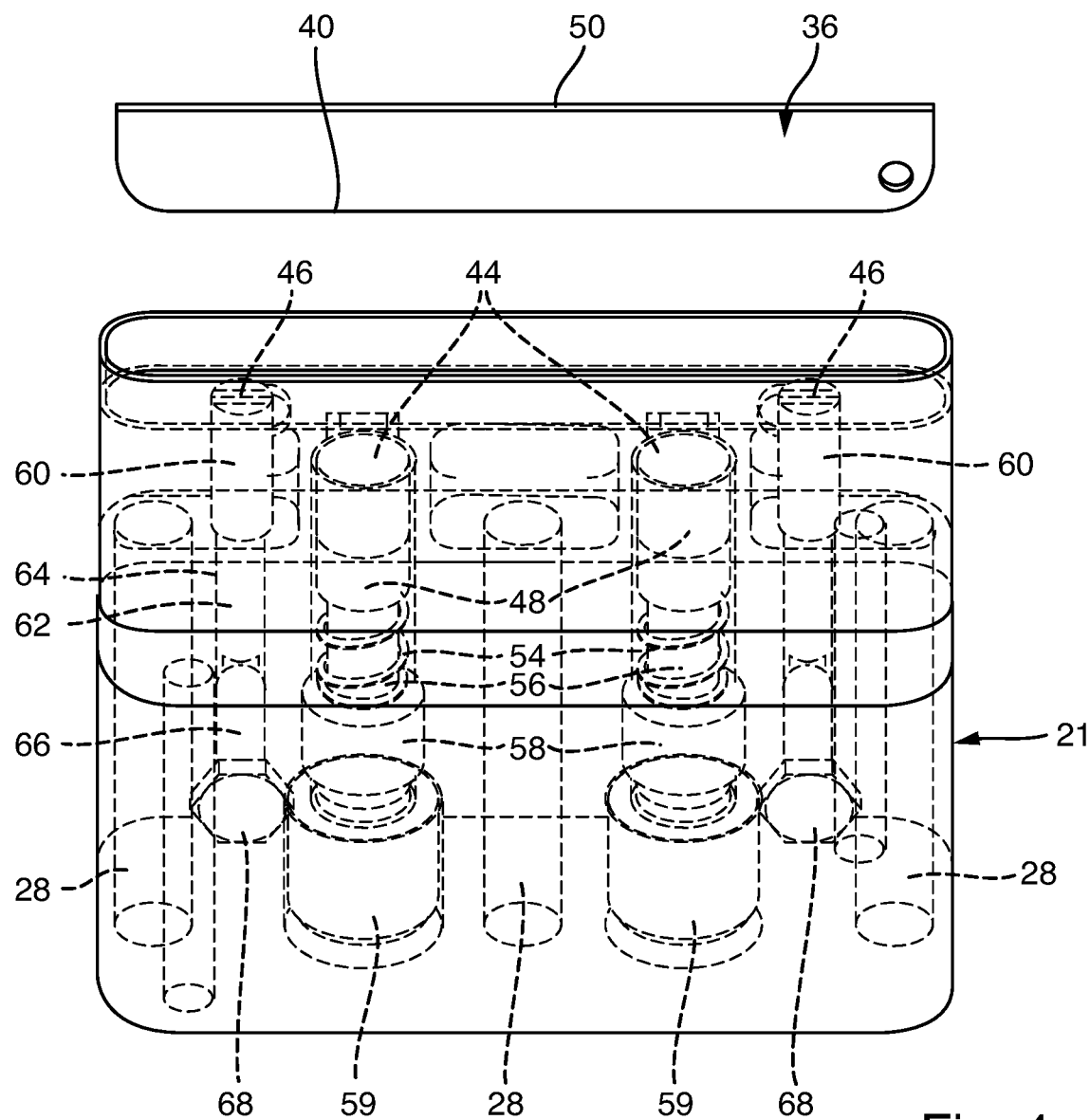
FIG. 4 shows a soldering nozzle from FIG. 3 as an individual part.

FIG. 3 shows a detail of a nozzle plate 10 comprising soldering nozzles 20 that corresponds to FIG. 1, with components that correspond to FIG. 1 being provided with corresponding reference signs. FIG. 4 shows a soldering nozzle 21 according to FIG. 3 as an individual part. In contrast to the embodiment according to FIGS. 1 and 2, the receiving grooves 46 in the embodiment according to FIGS. 3 and 4 are formed by insert parts 60 inserted into the main body 21. The insert parts 60 can in this case be adjusted in height on the main body 21. The insert parts 60 have a bolt portion 62 which is arranged in a bolt guide 64 so as to be axially movable, i.e. movable perpendicular to the plane of the nozzle plate 10. Fixing means in the form of clamping screws 66 are also provided which act against the relevant bolt portion 62 in order to fix the insert parts 60. The clamping screws 66 provide accessible screw heads 68 which can be actuated against or away from the relevant bolt portion 62 by means of a key. As a result, the height of the upper edge 38 of the separating strip 36 can be set such that the excess solder is wiped off in a favorable manner.

Figure 5:
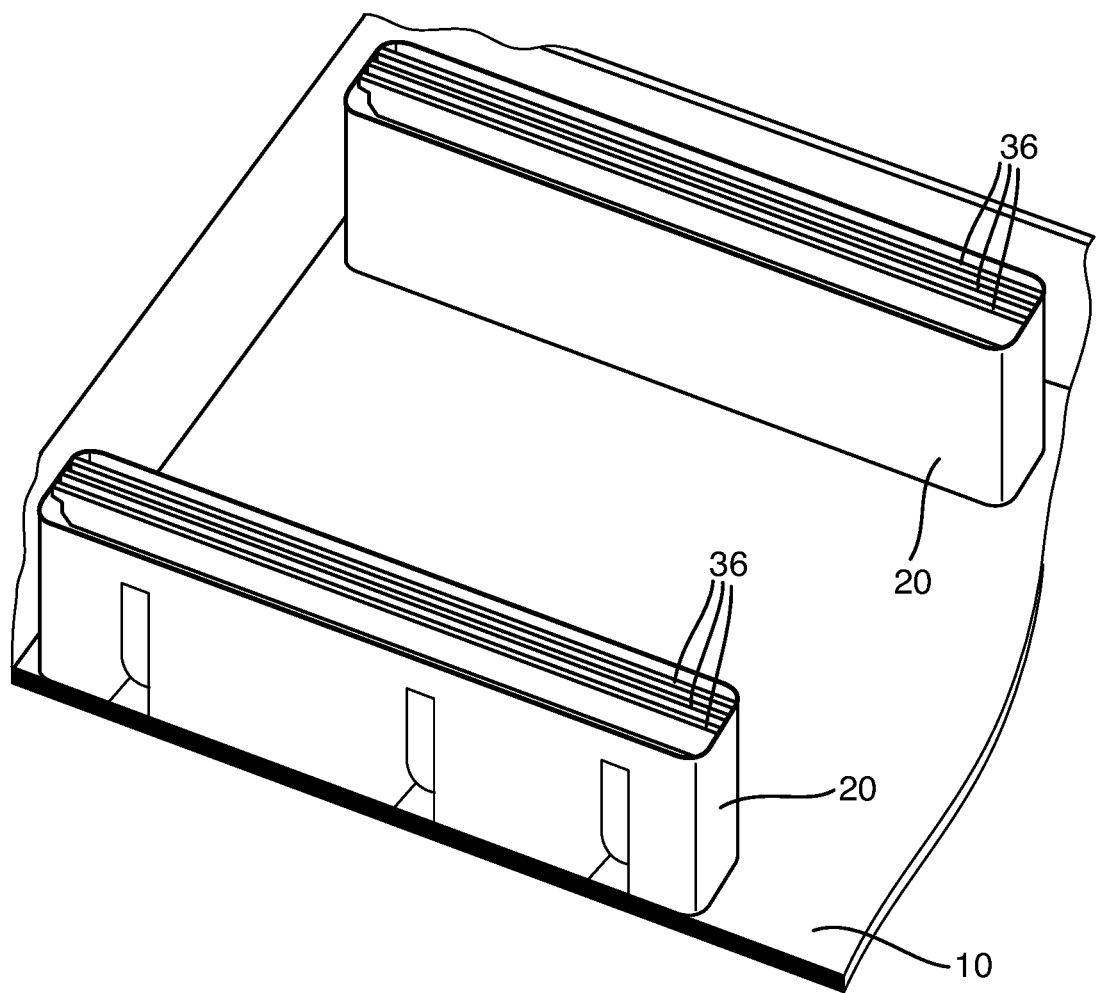
FIG. 5 is an oblique view onto soldering nozzles of a third embodiment according to the invention.

A further embodiment of a nozzle plate 10 comprising soldering nozzles 20 is shown in FIG. 5. Components which correspond to FIGS. 1 to 4 are provided with corresponding reference signs. As can be clearly seen from FIG. 5, a plurality of separating strips 36 are in this case arranged in a wave portion 26 of a soldering nozzle 20. The separating strips 36 are in this case each designed as individual separating strips 36 and do not have a frame connecting the separating strips 36 to one another. This is advantageous in that a different number of separating strips 36 can be provided depending on the soldering task, the printed circuit board to be soldered and the soldering nozzle used.

The invention claimed is:

1. Soldering nozzle for the simultaneous selective wave soldering of at least two spaced apart rows of solder joints in a soldering installation, comprising a main body which has a base portion that can be arranged on a nozzle plate and which has a wave portion that forms the solder wave during operation and has a peripheral wall having a free upper side, and comprising at least one separating strip which can be inserted into the wave portion and wetted with solder, the at least one separating strip being frameless and being made at least in portions from ferromagnetic material, the separating strip having free narrow sides and an underside, the narrow sides and/or the underside coming to rest against contact portions when the separating strip is inserted into the wave portion, and the contact portions being designed as receiving grooves which receive the narrow sides and/or the underside of the separating strip, wherein the receiving grooves are formed by insert parts inserted into the main body, and in that holding means which are intended for holding the separating strip and are in the form of holding magnets are provided in or on the main body, wherein the insert parts are height-adjustable in order to adjust the height of the separating strip in relation to the main body.

2. Soldering nozzle according to claim 1, characterized in that the insert parts have a bolt portion which is arranged in a bolt guide so as to be axially movable, and in that fixing means are provided for fixing the bolt portion.

3. Soldering nozzle according to claim 1, characterized in that magnet recesses are provided on the side of the bottom of the wave portion that faces away from the separating strip, in which magnet recesses holding magnets which interact with the separating strip are arranged.

4. Soldering nozzle according to claim 3, characterized in that pre-tensioned springs are provided to pre-load the holding magnets against the bottom of the wave portion.

5. Soldering nozzle according to claim 4, characterized in that the pre-tensioned springs are designed as spiral springs, one end of which is supported on the relevant holding magnet and the other end of which is supported on a threaded bolt which can be screwed into the main body.

6. Soldering installation comprising a nozzle plate and comprising at least one soldering nozzle according to claim 1.

7. Soldering nozzle for the simultaneous selective wave soldering of at least two spaced apart rows of solder joints in a soldering installation, comprising a main body which has a base portion that can be arranged on a nozzle plate and which has a wave portion that forms the solder wave during operation and has a peripheral wall having a free upper side, and comprising at least one separating strip which can be inserted into the wave portion and wetted with solder, the at least one separating strip being frameless and being made at least in portions from ferromagnetic material, the separating strip having free narrow sides and an underside, the narrow sides and/or the underside coming to rest against contact portions when the separating strip is inserted into the wave portion, and the contact portions being designed as receiving grooves which receive the narrow sides and/or the underside of the separating strip, wherein the receiving grooves are formed by insert parts inserted into the main body, and in that holding means which are intended for holding the separating strip and are in the form of holding magnets are provided in or on the main body, wherein the insert parts have a bolt portion which is arranged in a bolt guide so as to be axially movable, and in that fixing means are provided for fixing the bolt portion.

8. Soldering nozzle according to claim 7, characterized in that magnet recesses are provided on the side of the bottom of the wave portion that faces away from the separating strip, in which magnet recesses holding magnets which interact with the separating strip are arranged.

9. Soldering nozzle according to claim 8, characterized in that pre-tensioned springs are provided to pre-load the holding magnets against the bottom of the wave portion.

10. Soldering nozzle according to claim 9, characterized in that the pre-tensioned springs are designed as spiral springs, one end of which is supported on the relevant holding magnet and the other end of which is supported on a threaded bolt which can be screwed into the main body.

11. Soldering nozzle for the simultaneous selective wave soldering of at least two spaced apart rows of solder joints in a soldering installation, comprising a main body which has a base portion that can be arranged on a nozzle plate and which has a wave portion that forms the solder wave during operation and has a peripheral wall having a free upper side, and comprising at least one separating strip which can be inserted into the wave portion and wetted with solder, the at least one separating strip being frameless and being made at least in portions from ferromagnetic material, the separating strip having free narrow sides and an underside, the narrow sides and/or the underside coming to rest against contact portions when the separating strip is inserted into the wave portion, and the contact portions being designed as receiving grooves which receive the narrow sides and/or the underside of the separating strip, wherein the receiving grooves are formed by insert parts inserted into the main body, and in that holding means which are intended for holding the separating strip and are in the form of holding magnets are provided in or on the main body, wherein magnet recesses are provided on the side of the bottom of the wave portion that faces away from the separating strip, in which magnet recesses holding magnets which interact with the separating strip are arranged and pre-tensioned springs are provided to pre-load the holding magnets against the bottom of the wave portion.

12. Soldering nozzle according to claim 11, wherein the pre-tensioned springs are designed as spiral springs, one end of which is supported on the relevant holding magnet and the other end of which is supported on a threaded bolt which can be screwed into the main body.

\* \* \* \* \*